United States Patent
Butler et al.

(10) Patent No.: US 7,533,700 B2
(45) Date of Patent: May 19, 2009

(54) DUAL USE HYDROCARBON FUEL COMPOSITION

(75) Inventors: Graham Butler, Chicago, IL (US); Stephen David Cook, Camberley (GB); Michael Graham Hodges, Wonersh (GB); Graham Walter Ketley, Naperville, IL (US); Gregory James Lang, Yateley (GB)

(73) Assignee: BP Oil International Limited, London (GB)

( * ) Notice: Subject to any disclaimer, the term of this patent is extended or adjusted under 35 U.S.C. 154(b) by 531 days.

(21) Appl. No.: 11/485,876

(22) Filed: Jul. 13, 2006

(65) Prior Publication Data

US 2006/0254126 A1   Nov. 16, 2006

(30) Foreign Application Priority Data

Dec. 21, 2000 (GB) ................................. 0031333.8
Mar. 29, 2001 (GB) ................................. 0107909.4
Dec. 13, 2002 (WO) .................... PCT/GB01/05541

(51) Int. Cl.
*B65B 1/04* (2006.01)
*H01M 8/04* (2006.01)
*C10L 1/10* (2006.01)
*C10L 1/16* (2006.01)

(52) U.S. Cl. ................. 141/11; 141/1; 141/9; 141/104; 429/17; 44/300; 585/14

(58) Field of Classification Search ...................... 141/1, 141/9, 11, 83, 98, 104, 286; 429/17, 19; 44/300; 585/1, 13, 14, 24
See application file for complete search history.

(56) References Cited

U.S. PATENT DOCUMENTS

| | | | | |
|---|---|---|---|---|
| 2,657,985 | A * | 11/1953 | Schutze et al. ................. 585/16 |
| 6,048,451 | A * | 4/2000 | Huff et al. ..................... 208/237 |
| 6,458,173 | B1 * | 10/2002 | Lin ............................. 44/389 |
| 6,884,531 | B2 * | 4/2005 | Dabbousi et al. .............. 429/17 |
| 7,294,420 | B2 * | 11/2007 | Hodges ........................ 429/17 |
| 2003/0145514 | A1 * | 8/2003 | Akimoto et al. ............... 44/447 |
| 2003/0162060 | A1 * | 8/2003 | Butler et al. .................. 429/17 |
| 2006/0254126 | A1 * | 11/2006 | Butler et al. .................. 44/300 |

FOREIGN PATENT DOCUMENTS

| | | |
|---|---|---|
| JP | 2000-251917 | 9/2000 |
| JP | 2000-303836 | 10/2000 |
| WO | WO 99/65097 | 12/1999 |

\* cited by examiner

*Primary Examiner*—Timothy L Maust
(74) *Attorney, Agent, or Firm*—Kelly L. Cummings

(57) ABSTRACT

A hydrocarbon fuel composition which is suitable for sue in a fuel cell apparatus and an internal combustion engine comprises at least one saturated aliphatic hydrocarbon having 4 to 12 carbon atoms, and is characterised by an olefin content of less than 20% by volume, an aromatics content of less than 42% by volume, a final boiling point (fop) of less than 215° C., and a sulphur content of less than 20 ppm.

27 Claims, 1 Drawing Sheet

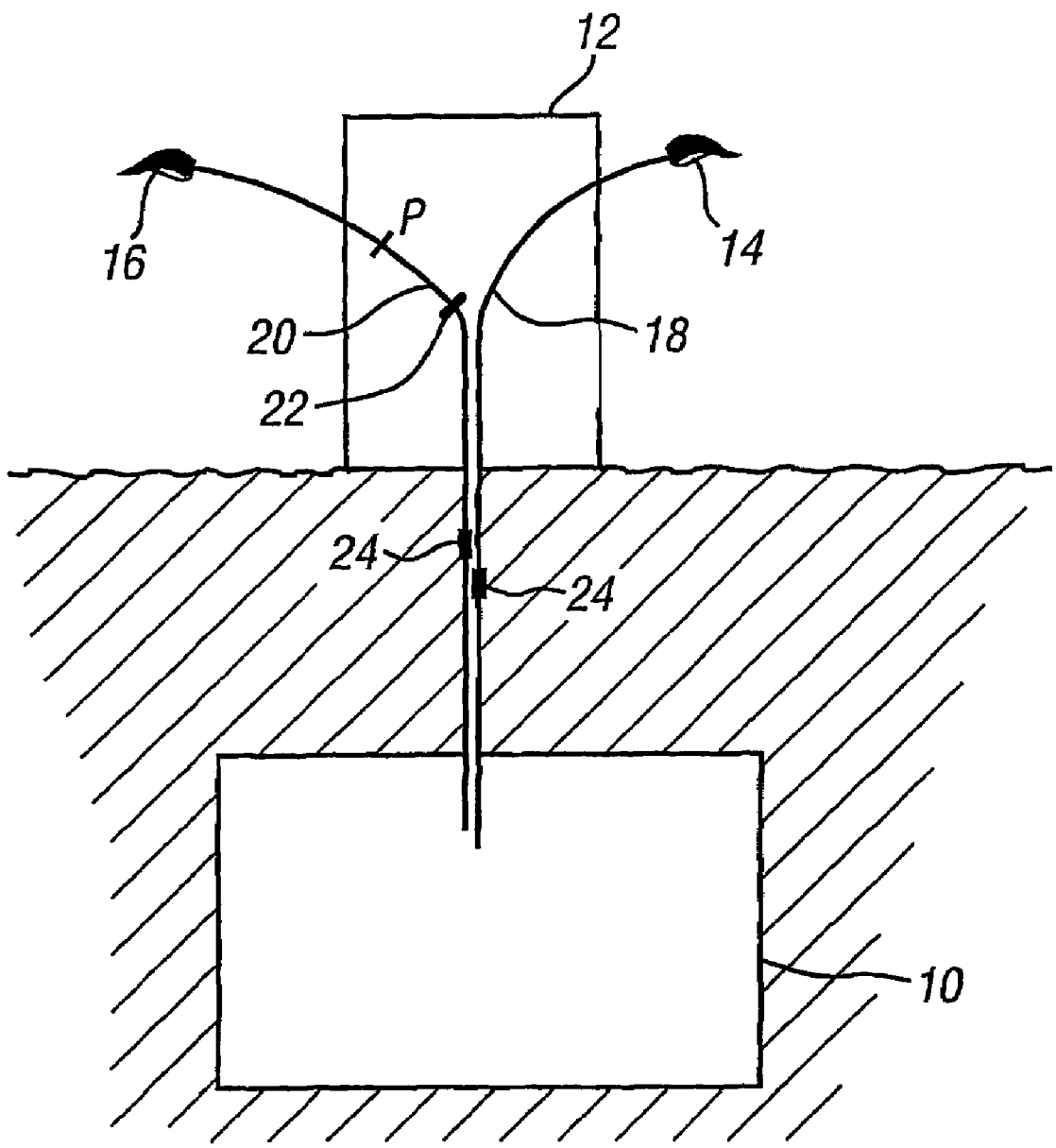

DUAL USE HYDROCARBON FUEL COMPOSITION

The present invention relates to a fuel composition, and in particular, one which is suitable for dual use that is as a fuel for both a fuel cell apparatus and an internal combustion engine.

A fuel cell is an electrochemical device that combines hydrogen fuel and oxygen from the air to produce electricity, heat and water. A fuel cell operates without combustion, making it a clean and reliable source of energy. For this reason, there is a growing interest in the use of fuel cells as a source of power for vehicles.

The hydrogen employed in a fuel cell can be stored directly, or produced in-situ, for example, by reforming a hydrocarbon fuel, such as diesel or gasoline. Conventional hydrocarbon fuels employed in internal combustion engines, however, may be unsuitable for use in fuel cell apparatus, as they may give rise to by-products (eg coke) which damage the components of the fuel cell apparatus.

We have now developed a fuel composition which is suitable for use in both a fuel cell apparatus and an internal combustion engine.

Accordingly, the present invention provides a hydrocarbon fuel composition which is suitable for use in a fuel cell apparatus and an internal combustion engine, said hydrocarbon fuel composition comprising at least one saturated aliphatic hydrocarbon having 4 to 12 carbon atoms, and characterised by:
- an olefin content of less than less than 20% by volume,
- an aromatics content of less than 42% by volume,
- a final boiling point (fbp) of less than 215° C., and
- a sulphur content of less than 20 ppm.

Also according to the present invention, there is provided a hydrocarbon fuel composition which is suitable for use in a fuel cell apparatus and an internal combustion engine, said hydrocarbon fuel composition comprising at least one saturated aliphatic hydrocarbon having 4 to 12 carbon atoms, and characterised by:
- an olefin content of less than less than 20% by volume,
- an aromatics content of less than 42% by volume,
- a final boiling point (fbp) of less than 185° C., and
- a sulphur content of less than 20 ppm.

The present invention also provides the use of such fuel compositions as a fuel for both a fuel cell apparatus and an internal combustion engine.

Thus, according to another aspect of the present invention there is provided a method of fuelling a fuel cell apparatus, said method comprising:
- providing a fuel composition comprising at least one saturated aliphatic hydrocarbon having 4 to 12 carbon atoms, and characterised by:
  - an olefin content of less than less than 20% by volume,
  - an aromatics content of less than 42% by volume,
  - a final boiling point (fbp) of less than 215° C., and
  - a sulphur content of less than 20 ppm,
- providing a fuel cell apparatus comprising a conversion unit and a fuel cell unit,
- introducing the fuel composition into the conversion unit, and
- operating the conversion unit under suitable conditions to convert at least some of the fuel composition into a product stream comprising hydrogen, and optionally, introducing the hydrogen produced in the conversion unit into the fuel cell unit.

Also, according to the present invention there is provided a method of fuelling a fuel cell apparatus and an internal combustion engine, said method comprising:
- providing a reservoir for a fuel composition comprising at least one saturated aliphatic hydrocarbon having 4 to 12 carbon atoms, and characterised by:
  - an olefin content of less than less than 20% by volume,
  - an aromatics content of less than 42% by volume,
  - a final boiling point (fbp) of less than 215° C., and
  - a sulphur content of less than 20 ppm,
- providing a first conduit for delivering the fuel composition in said reservoir to a fuel cell apparatus, and a second conduit for delivering the fuel composition in said reservoir to an internal combustion engine, and optionally,
- delivering the fuel composition in said reservoir to said fuel cell apparatus via said first conduit, and/or
- delivering the fuel composition in said reservoir to said internal combustion engine via said second conduit.

The hydrocarbon fuel composition of the present invention comprises at least one saturated aliphatic hydrocarbon having 4 to 12 carbon atoms. Preferably the saturated aliphatic hydrocarbon has 4 to 10, for example, 5 to 8 carbon atoms. A mixture of saturated aliphatic hydrocarbons may be present in the fuel composition. This mixture may comprise at least one branched chain saturated aliphatic hydrocarbon compound. Preferably, the mixture consists predominantly of such branched chain compounds. Suitable branched chain hydrocarbons include alkanes of 4 to 12 carbon atoms having at least one branch (eg 2 or 3 branches) in their alkyl chain. Examples of branched chain hydrocarbons include isobutane, isopentane, isohexane, and isooctane. Preferably, the mixture comprises highly branched alkanes. A preferred example of a suitable highly branched alkane is one having the formula:

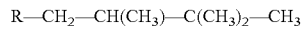

$$R-CH_2-CH(CH_3)-C(CH_3)_2-CH_3 \qquad I$$

wherein R is hydrogen or, preferably, methyl. When R is methyl, the alkane represented by Formula I is called triptane. Such alkanes are described in detail in EP 1068282, which is incorporated herein by reference. Such alkanes may be prepared using any suitable method, for example, using the process described in GB 0105165.5, filed on Mar. 2, 2001.

Another example of a suitable alkane is an alkane of 8-12 carbon atoms, preferably, 8 or 10 carbon atoms having at least 4 methyl and/or ethyl branches. Methyl branches are generally preferred. Such alkanes are described in detail in PCT/GB00/03569, and will hereinafter be referred to alkanes "A". Suitable methods for preparing alkanes "A" are also described in PCT/GB00/03569.

Alkanes "A" usually comprise a backbone chain of 4 to 7, preferably, 4 to 6, more preferably, 4 or 5 carbon atoms. The methyl, and/or ethyl branches are attached to this backbone chain. Advantageously, there are no branched groups constituting the branches other than methyl or ethyl. One or two methyl or ethyl groups may be attached to the same carbon atom of the backbone chain. Preferably, alkane "A" has a pair of methyl substituents at the 2, 3 and/or 4 C position along the backbone chain, more preferably, at the 2 or 3 C position.

Preferred examples of alkane "A" include 3,3,4,4-tetramethyl hexane, 2,2,3,3-tetramethyl butane, 2,2,3,3-tetramethyl pentane, 2,2,3,3,4-pentamethyl pentane, 2,2,3,4,4-pentamethyl pentane, 2,3,3,4-tetramethyl pentane, 2,2,3,4-tetramethyl pentane, 2,2,3,3,4,4-hexamethyl pentane, 2,2,4,4,6-pentamethyl heptane.

The saturated aliphatic hydrocarbon may be present in the fuel composition as a distillation product and/or reaction product from a refinery. Such refinery products may contain at least 60%, preferably at least 70% w/w, for example, 60 to 95% w/w of saturated aliphatic hydrocarbon. Examples of suitable refinery distillation products include naphtha and/or straight run gasoline. Examples of suitable refinery reaction products include alkylates, isomerates, light reformates, light hydrocrackates and mixtures thereof.

The amount of saturated aliphatic hydrocarbon in the fuel composition may be greater than 50% by volume, preferably, greater than 70% by volume, more preferably, greater than 80% by volume, and most preferably greater than 90% by volume.

The fuel composition may comprise an effective amount, for example at least 2 % by volume, of highly branched alkane such as triptane or alkane "A". In another embodiment, the fuel composition comprises greater than 70% by volume triptane or alkane "A", preferably, greater than 80% by volume, more preferably, greater than 90% by volume, and most preferably, greater than 95% by volume.

As mentioned above, the fuel composition of the present invention has an olefin content of less than 20% by volume. Preferably, the olefin content of the fuel composition is less than 10% by volume, more preferably, less than 5% by volume and most preferably less than 1% by volume. The olefin present in the fuel composition may be an alkene of 5 to 10, for example, 6 to 8 carbon atoms. Such alkenes may be linear or branched. Suitable examples include pentene, isopentene, hexene, isohexene, heptene or 2-methyl-2-pentene and a mixture thereof. Such alkenes may be produced by any suitable method known in the art, for example, by catalytically or thermally cracking a residue from crude oil.

The fuel composition has an aromatics content of less than 42% by volume, preferably less than 35% by volume, more preferably, less than 25% by volume and most preferably, less than 10% by volume. Suitable aromatic compounds that may be present in the fuel composition include toluene, o-m-p-xylene and trimethyl benzene. Mixtures of aromatic compounds may also be present Such mixtures may be derived from catalytically reformed or cracked gasoline obtained, for example, from heavy naphtha. Preferably, the fuel composition is substantially free of benzene. The fuel composition may also be substantially free of aromatics.

The fuel composition may comprise octane boosters such as cyclopentane.

The fuel composition of the present invention may also contain at least one oxygenate. Suitable oxygenates include alcohols and ethers, such as dialkyl ethers. Preferably, an asymmetric ether is employed. Examples include methyl tertiary butyl ether (MTBE), ethyl tertiary butyl ether and methyl tertiary amyl ether. Preferably, the amount of oxygenate in the fuel composition is less than 5% by volume more preferably less than 3% by volume.

Preferably, the fbp of the fuel composition for use in a fuel cell apparatus is less than 200° C., more preferably, less than 185° C., most preferably less than 180° for example, between 155° and 175° C.

The sulphur content of the fuel composition is preferably, less than 10 ppm. More preferably, less than 5 ppm, even, more preferably; less than 1 ppm, and most preferably, less than 0.5 ppm. For example, the sulphur content of the fuel composition maybe less than 0.1 ppm.

The hydrocarbon fuel composition of the present invention may have a Motor Octane Number (MON) of at least 80, and a Research Octane Number (RON) of at least 90. Preferably, the fuel composition has an MON of at least 85, and an RON of at least 95.

The hydrocarbon fuel composition of the present invention may have an Reid Vapour Pressure (RVP) of up to 100, preferably 35 to 100, more preferably 45 to 100 kPa.

The density of the fuel composition may be greater than 0.4 g/cm$^3$, preferably, greater than 0.5 g/cm$^3$, more preferably, greater than 0.7 g/cm$^3$ and most preferably, between 0.7 and 0.8 g/cm$^3$.

The fuel composition of the present invention may comprise additives, such those employed in conventional fuel compositions for use in internal combustion engines. Equally, however, such additives may be substantially absent from the fuel composition.

The fuel composition of the present invention may be prepared by any suitable method, for example, by blending appropriate components together. One embodiment of the present invention is prepared by blending iso-paraffin (alkylate), hydrocrackate and isomerate together. The amount of iso-paraffin employed may be such that it forms 20 to 80% by volume, preferably, 50 to 70% by volume, for example, 60% by volume of the final fuel composition. The amount of hydrocrackate employed may be such that it forms 5 to 35% by volume, preferably, 10 to 30% by volume, for example, 20% by volume of the final fuel composition. The amount of isomerate employed may be such that it forms 10 to 50% by volume, preferably, 20 to 40% by volume, for example, 30% by volume of the final fuel composition. It may also be desirable to include reformate and/or Full Range Catalytically Cracked Spirit (FRCCS) in the fuel composition. The former may be employed in an amount of 0 to 40, for example, 20% by volume; the latter, in an amount of 0 to 30, for example, 15% by volume.

As mentioned above, the fuel composition of the present invention is suitable for a fuel cell apparatus. Thus, according to a further aspect of the present invention, there is provided a method of fuelling a fuel cell apparatus, said method comprising:

providing a fuel composition of the present invention,
providing a fuel cell apparatus comprising a conversion unit and a fuel cell unit,
introducing the fuel composition of the present invention into the conversion unit, and operating the conversion unit under suitable conditions to convert at least some of the fuel composition of the present invention into a product stream comprising hydrogen, and optionally,
introducing the hydrogen produced in the conversion unit into the fuel cell unit.

The conversion unit may be any conversion unit, which may be operated to convert a hydrocarbon into a product stream comprising hydrogen. Generally, carbon monoxide and/or carbon dioxide is produced in addition to hydrogen. Typically, both carbon monoxide and carbon dioxide are produced in such a conversion unit, for example, in a mole ratio of 0.1:1 to 10:1. Suitable conversion units include reformers and partial oxidation apparatuses. In certain embodiments of the present invention, both reformers and partial oxidation apparatuses are employed.

A suitable reformer is a steam reformer, which operates by reacting a hydrocarbon with steam to produce hydrogen and carbon monoxide and/or carbon dioxide. The steam reformer may be a thermal reformer, which operates in the absence of a reforming catalyst. Conventional thermal reforming conditions, for example, of pressure and temperature may be employed.

As an alternative to a thermal reformer, a catalytic reformer may be employed. Catalytic reformers operate by reacting hydrocarbon with steam in the presence of a reforming catalyst. Suitable steam reforming catalysts are known in the art.

They include transition metal catalysts, such as rhodium, nickel, cobalt, platinum, palladium, ruthenium and iridium. The catalyst may be supported or unsupported. Catalytic reformers may be operated at temperatures of 600 to 1000° C., preferably, 700 to 1800° C. Suitable catalytic reforming pressures range from 1 to 5 atmospheres.

As mentioned above, the conversion unit may comprise a partial oxidation apparatus. Such an apparatus operates by reacting hydrocarbon with oxygen under partial oxidation conditions to produce hydrogen and carbon monoxide and/or carbon dioxide. The partial oxidation reaction may be carried out in the presence or absence of a partial oxidation catalyst. Suitable partial oxidation catalysts are well known in the art. They include transition metal catalysts, such as rhodium, nickel, cobalt, platinum, palladium, ruthenium and iridium. The catalyst may be supported or unsupported. The partial oxidation reaction may be carried out at temperatures of 600 to 1000° C., preferably, 700 to 1800° C. Suitable reaction pressures range from 1 to 5 atmospheres.

As mentioned above, the effluent from the conversion unit comprises a product stream comprising hydrogen. Typically, this product stream also comprises carbon monoxide. Carbon monoxide may be removed from the product stream by oxidation. The reaction converts the carbon monoxide to carbon dioxide, releasing heat in the process. This heat may be used to drive the conversion, for example, the reforming reaction.

Additionally or alternatively, carbon monoxide may be removed from the product stream by a water gas shift reaction. In a water gas shift reaction, carbon monoxide is reacted with steam in the presence of a catalyst to produce carbon dioxide and hydrogen. Suitable water gas shift catalysts include iron oxide and chromic oxide. Conventional water gas shift conditions of, for example, pressure and temperature may be employed. The hydrogen produced in the water shift reaction may be introduced to a fuel cell unit.

Hydrogen from the conversion unit is optionally introduced to a fuel cell unit. Typically, the fuel cell unit is operated under conditions suitable for converting the hydrogen into water. Suitable fuel cell catalysts are well-known in the art. Suitable fuel cell operating temperatures and pressures are also well known.

The fuel cell apparatus of this aspect of the present invention may be located on a vehicle, such as a car, lorry, truck, SUV (sports utility vehicle) or bus. Alternatively, only part of the fuel cell apparatus, such as the fuel cell unit, may be located on a vehicle. The remainder of the fuel cell apparatus, such as the conversion unit, may be located at a stationary depot, such as a filling station. It may be possible to store the hydrogen produced in the conversion unit prior to introducing it into the fuel cell unit. For example, the hydrogen may be stored in a hydrogen store, located on the vehicle and/or at the stationary depot.

The fuel cell unit may be employed to generate at least some of the power necessary to drive the vehicle. Where the fuel cell unit is unsuitable for generating all the power necessary to drive the vehicle, additional power may be provided by alternative means. Examples of suitable sources of energy include conventional electrochemical cells, solar cells and internal combustion engines. In one embodiment, the additional power source is an internal combustion engine provided on the same vehicle. An internal combustion engine may be fuelled directly using the fuel composition of the present invention.

As mentioned above, the fuel composition of the present invention is suitable for use as a fuel for both fuel cell apparatus and internal combustion engines. For example, the fuel composition may be employed as a fuel for a fuel cell-powered vehicle and a vehicle powered by an internal combustion engine. Alternatively, the fuel composition may be employed as a fuel for a vehicle which is powered by both a fuel cell and an internal combustion engine. Thus, in accordance with a further aspect of the present invention, there is provided a method of fuelling a fuel cell apparatus and an internal combustion engine, said method comprising:

providing a reservoir for a fuel composition,
providing a first conduit for delivering the fuel composition in said reservoir to a fuel cell apparatus, and a second conduit for delivering the fuel composition in
said reservoir to an internal combustion engine, and optionally,
delivering the fuel composition in said reservoir to said fuel cell apparatus via said first conduit, and/or
delivering the fuel composition in said reservoir to said internal combustion engine via said second conduit.

Prior to delivering the fuel composition to the fuel cell apparatus and/or internal combustion engine, it may be desirable to reduce the sulphur content of the fuel composition to the desired levels. This maybe carried out by passing the fuel composition through a sulphur trap. Such a sulphur trap may be positioned in the first conduit and/or second conduit. Alternatively, the sulphur trap may be located in a third conduit, through which the fuel composition is allowed to pass prior to it entering the first and/or second conduits.

As mentioned above, the fuel composition of the present invention may comprise additives, such as those employed in conventional fuel compositions for internal combustion engines. Such additives, however, may be detrimental to the operation of fuel cell apparatus. Accordingly, it may be advantageous to add such additives only to fuel compositions destined for internal combustion engines. This can be achieved, for example, by adding such additives to the fuel composition in the second conduit, but not to fuel compositions in the first conduit The second conduit may be provided with means for preventing additive-containing fuel from contaminating the fuel composition in the reservoir or any fuel composition destined for fuel cell apparatus. Such means may include one or more taps or valves.

These and other aspects of the present invention will now be described, by way of example, with reference to FIG. 1, which is a schematic diagram of an apparatus suitable for carrying out the method of the present invention.

FIG. 1 depicts an apparatus comprising a reservoir 10, a dispensing unit 12, and dispensing nozzles 14 and 16. The reservoir 10 is located below ground level, underneath the dispensing unit 12. The dispensing unit 12 is located on the ground, for example, on a service station forecourt.

The reservoir 10 to the dispensing nozzles 14, 16 via conduits 18, 20.

Specifically, conduit 18 feeds nozzle 14, which is intended for fuelling a fuel cell-powered vehicle. Conduit 20, on the other hand, feeds nozzle 16, which is intended for fuelling a vehicle powered by an internal combustion engine. Conduit 20 is coupled to a source of additives (not shown) at point P. Conduit 20 is also provided with a tap 22, which maybe actuated to prevent fuel in the conduit from returning to the reservoir 10.

The apparatus is provided with sulphur traps 24. These are located in conduits 18 and 20 for reducing the sulphur content of any fuel flowing through the conduits to desired levels.

In use, the reservoir 10 is filled with a fuel composition which is suitable for fuelling both a fuel cell apparatus and an internal combustion engine. When nozzle 14 is actuated, the fuel in the reservoir 10 is caused to rise through conduit 18 through the dispensing unit 12 and out through the nozzle 14.

By passing through the conduit 18 in this manner, the fuel comes into contact with the sulphur trap 24, which reduces the sulphur content of the fuel to desired levels. The fuel emerging from the nozzle 14 is therefore suitable for fuelling a fuel cell-powered vehicle.

When nozzle 16 is actuated, the fuel in the reservoir 10 is caused to rise through conduit 20 through the dispensing unit 12 and out through the nozzle 16. Bypassing through the conduit 18 in this manner, the fuel comes into contact with the sulphur trap 24, which reduces the sulphur content of the fuel to desired levels. Actuation of the nozzle16 also causes additives to flow from the additive source (not shown) into the conduit 20 at point P. Thus, the fuel emerging from the nozzle 16 contains the additives necessary for ensuring smooth operation of an internal combustion engine. When sufficient fuel has been dispensed through nozzle 16, the nozzle 16 can be actuated to close tap 22. This prevents additive-containing fuel from returning to the reservoir 10.

EXAMPLES 1-3

The composition of the formulated fuels are given in Table 1.

In each case the fuels were tested for MON and RON, their Reid Vapour Pressure at 37.8° C., their calorific value, and their distillation properties. The results are also shown in Table 1.

TABLE 1

| | Example | | |
|---|---|---|---|
| | 1 | 2 | 3 |
| Composition % v/v | | | |
| Full Range Steam Cracked Spirit | — | 21 | 16 |
| Catalytic Reformate | 44 | 35 | 15 |
| Catalytic polymerate | — | 1 | — |
| Light hydrocrackate | 30 | 25 | — |
| Alkylate | 24 | 18 | 30 |
| Reformate | — | — | 12 |
| Isopentane | 2 | — | — |
| Isohexane | — | — | 15 |
| Isooctane | — | — | 12 |
| Analysis, % by volume | | | |
| Aromatics | 30 | 34.1 | 24.6 |
| Olefins | 0.5 | 4.2 | 5 |
| Benzene | 0.52 | 0.64 | 0.99 |
| Carbon content (% by weight) | 87.2 | 87.3 | 86.1 |
| Hydrogen content (% by weight) | 13.2 | 12.9 | 13.8 |
| Sulphur content (ppm by weight) | 1.9 | 8.2 | 5.5 |
| Research Octane Number (RON) | 95.4 | 96.7 | 96.8 |
| Motor Octane Number (MON) | 87.2 | 85.6 | 87.6 |
| Calorific value (calc) (Btu/lb) | 18650 | 18646 | 18764 |
| Density at 15° C. (kg/liter) | 0.7425 | 0.7463 | 0.733 |
| Reid Vapour Pressure (kPa) | 57.6 | 60 | 48 |
| Distillation (° C.) | | | |
| T 10% | 55 | 53 | 60 |
| T 50% | 100 | 97 | 99 |
| T 90% | 148 | 151 | 143 |
| Final Boiling Point (° C.) | 181 | 181 | 176 |
| Oxidation stability | 1.9 | 8.2 | 5.5 |

FURTHER EXAMPLES

Three fuel compositions were prepared by blending appropriate components together. In the present case, Cat. Cracked Spirit (CCS), alkylate and reformate which bad been distilled to the appropriate final boiling point value were blended. The three components were blended in the volume ratios CCS: alkylate:reformate in the volume ratio 20:50:30. The fuel compositions were analysed and results are give in Table 2. According to the densities of the components, the aromatics and olefins contents by volume would be expected to be comparable or slightly less than the values expressed by weight.

TABLE 2

| | W01/463 | W01/464 | W01/465 |
|---|---|---|---|
| Olefins % by weight | 5.1 | 8.2 | 7.2 |
| Aromatic % by weight | 37.2 | 32.0 | 33.7 |
| Final boiling point ° C. | 206.2 | 142.8 | 154.2 |
| Sulphur content ppm by weight | 38 | 54 | 50 |

Use in a Single Cylinder Internal Combustion Engine.

The fuel compositions were tested as a fuel in a single cylinder internal combustion engine.

In order to represent the effects of these fuels up to the period of catalyst light-off, a number of considerations were applied. Taking the view that the most significant events occurring before catalyst light-off are due to initial engine start-up from cold and subsequent operation, the test engine lubricant and coolant system were run with external cooling to achieve stable operating temperatures of around 29° C. and 47° C. respectively. The engine speeds and loads used for these tests were based around typical engine operating conditions that occur between engine start up and the catalyst light-off period during a European vehicle emissions test. During this period from engine start-up to catalyst light-off, the vehicle is driven over the first 2 cycles of the ECE test cycle. Generally speaking, when accelerating away from rest or to drive or climb a hill, a richer mixture is required (Lambda less than 1.000) and especially so when the engine is cold. Lambda is the ratio of actual air:fuel ratio divided by the calculated, stoichiometric air:fuel ratio. When cruising at a constant speed, less enrichment is required and fuelling is controlled closer to Lambda 1.000 and especially so when the engine begins to warm up.

An estimation of engine speed over the first 2 test cycle hills of the ECE cycle) was around 1800 rpm representing the $1^{st}$ gear acceleration and cruise, followed by 2100 rpm for the $2^{nd}$ gear acceleration and cruise over the second test cycle hill. These 2 engine speeds were chosen for these tests alongside 2 Lambda settings of 0.900 and 1.000, representing the accelerating and cruising fuelling demands of the engine over the same part of the cycle respectively.

The tests were carried out at part throttle. Iso-Octane fuel was used as a control fuel for this test programme. This control fuel was tested at all test modes before and after testing the candidate fuels. Running on iso-Octane, the engine was optimised over the 4 test modes, namely:

| | |
|---|---|
| 1800 rpm/Lambda 0.900 | 1800 rpm/Lambda 1.000 |
| 2100 rpm/Lambda 0.900 | 2100 rpm/Lambda 1.000 |

At each test mode, spark timing was adjusted to achieve MBT (minimum spark advance for best torque) at the above speed and lambda settings. At stable conditions at each of the above test conditions, engine, exhaust emission and environmental parameters were logged.

Each of the candidate test fuels were tested in turn using the MBT spark requirement for the control fuel. Throttle position and fuelling parameters were adjusted to obtain the same observed torque settings as achieved with the control fuel. Engine, exhaust emission and environmental parameters were logged at stable test conditions at each test mode.

The control fuel testing was repeated after completing the testing of the candidate fuels.

The performance of W01/464 and W01/465 were compared to W01/463 as a reference fuel and the results are given in Table 3.

Results Summary

At both test engine speeds, significant reductions in fuel consumption and emissions are achieved at 0.900 Lambda for fuels W01/464 and W01/465, when compared to W01/463. For W01/464, at 1800 r/min and 0.900 Lambda, a 10% benefit in fuel consumption relates to a subsequent 10% reduction in CO2 emissions and a sizeable 25% reduction in Brake Specific (BS) HC emissions. Reductions were also recorded in BSCO and BSNOx emissions, although not to the same degree.

W01/464 produced a 5% reduction in fuel consumption and BSCO2 emissions and a further 15% in BSHC emissions when compared to W01/463 at 2100 rpm and Lambda 0.900. BSCO and BSNOx emission benefits were again visible but not as significant.

W01/465 also demonstrated significant reductions in fuel consumption BSCO2 and BSHC emissions when compared to W01/463 at the lower speed of 1800 rpm and a Lambda of 0.900. The advantages of this fuel are reduced at 2100 rpm and 0.900 Lambda.

At Stoichiometric, Lambda 1.000, negligible fuel consumption benefits were recorded at either engine speed for either W01/464 or W01/465 fuels compared to W017463. Emissions benefits were generally less at Lambda 1.000, although at both engine speeds, significant BSHC reductions were recorded for W01/464 and significant BSCO reductions were noted for W01/465. An increase in BSNOx emissions was noted, however, at the same conditions with this fuel.

It can be concluded that from the tests that compared to W01/463, both W01/464 and W01/465 demonstrated significant benefits in fuel economy and exhaust emissions with a relatively cold engine running at rich mixtures (conditions that would be experienced at pre-light off periods). This type of condition would represent well, the period between starting an engine in the morning or from cold and the initial first few minutes of driving. Compared to W01/463, W01/464 demonstrated a consistent significant reduction in BSHC emissions across all test speed and Lambda settings. Generally speaking, other emissions and fuel economy benefits were less at Lambda 1.000 with most figures within the limits of repeatability.

W01/464 demonstrates a consistent significant reduction in BSHC emissions across all test speed and Lambda settings. Generally speaking, other emissions and fuel economy benefits were less at Lambda 1.000 with most figures within the limits of repeatability.

TABLE 3

SUMMARY OF PATENT FUEL PERFORMANCE COMPARED TO W01/463

| Engine Speed rpm | Fuel ID | LAMBDA | Corrected BSFC % diff from W01/463 | Corrected Mass Fuel flow % diff from W01/463 | BSCO % diff from W01/463 | BSCO2 % diff from W01/463 | BSHC % diff from W01/463 | BSNOx % diff from W01/463 |
|---|---|---|---|---|---|---|---|---|
| 1800 | W01/464 | 0.900 | −9.74% | −9.47% | −4.60% | −10.64% | −24.75% | −1.57% |
| 1800 | W01/465 | 0.900 | −6.78% | −6.58% | −1.15% | −8.46% | −10.76% | −2.98% |
| 1800 | W01/464 | 1.000 | 0.28% | −0.13% | 1.00% | 0.32% | −8.82% | 0.82% |
| 1800 | W01/465 | 1.000 | −1.47% | −1.40% | −13.25% | −2.13% | 0.61% | 9.14% |
| 2100 | W01/464 | 0.900 | −4.45% | −4.38% | −2.08% | −5.75% | −14.24% | 2.69% |
| 2100 | W01/465 | 0.900 | −0.88% | −1.35% | 1.28% | −2.24% | −4.16% | 5.62% |
| 2100 | W01/464 | 1.000 | −2.07% | −1.32% | −5.89% | −1.48% | −10.64% | 0.52% |
| 2100 | W01/465 | 1.000 | 1.22% | 1.12% | −17.87% | 1.52% | 0.51% | 5.68% |

Test Conditions:

| | | | |
|---|---|---|---|
| Test date | Jun. 11, 2001 | Baro | 1011 mbar |
| Test Engine | Single cylinder Hydra | Average Air Inlet temp | 24° C. |
| Bore | 82.6 mm | Average RH | 55% |
| Stroke | 88.9 mm | Average Oil temp | 29° C. |
| Swept volume | 476.38 cc | Average Coolant temp | 47° C. |
| Compression ratio | 9:1 | | |
| Test Lubricant | Mobil 1 fully synthetic | | |

All three fuels functioned as fuels in the internal combustion engine tests. All three fuel compositions had inherently low front-end volatility parameters RVP and E70 thus indicating that these fuel compositions are unlikely to exhibit any driveability malfunctions associated with hot weather operation. In addition, Vapour Lock Index (VLI) defined as: VLI=RVP+7×E70 is also used as a measure to quantify a fuels tendency to exhibit hot driveability problems and is controlled in current fuel specifications. Fuels W01/464 and W01/465 exhibited a reduction in VLI compared with W01/463 again confirming that for these fuels, reducing fbp does not compromise hot weather driveability performance.

In absolute terms, the low E100 values of the three fuel compositions W01/463, W01/464 and W01/465 suggest that the fuel compositions may be susceptible to cold weather driveability (CWD) problems in some vehicles at very low ambient temperatures. However, in relative terms the test fuels with lower final boiling point (W01/464 and W01/465) should exhibit superior CWD than that of W01/463 by view of their increased E100 levels. This shows that for these fuels, reducing the final boiling point increases E100 and would contribute to improved CWD performance.

Furthermore, although all three fuels had Driveability indices (DI=1.5×T10+3×T50+T90) above the World Wide Fuel Charter (WWFC) recommendation of 555, W01/464 and W01/465 had Driveability Indices of 557 and 571 respectively, which are superior to the 615 achieved with W01/463. For these fuels, reducing final boiling point reduces DI and hence contributes to improved CWD performance.

Use of Fuel Compositions for a Fuel Cell Apparatus.

The three fuel compositions prepared above were tested in a reformer (conversion unit) to produce hydrogen which could be used to power a fuel cell unit.

Catalyst Preparation

The catalyst consisted of cylindrical alpha-alumina foams, 27 mm in diameter by 30 mm long. The porosity was 30 ppi and the voidage was approximately 85%. The foams were washcoated with a zirconia/gamma alumina mix which was calcined to 500° C. and it was upon this that rhodium was loaded using an aqueous solution of rhodium trichloride. The loading was equivalent to 0.5 wt % (of the total foam weight) of rhodium metal, which was in the form of the sesquioxide after calcination at 750° C. for 6 hours.

Reformer Operation

All experiments were performed in an autothermal reformer (ATR) rig consisting of a water vaporiser, fuel vaporiser, reactor and gas sampling system. Fuel, water and air were supplied to the reactor at a gas hourly space velocity (GHSV) of 19,000 hr$^{-1}$ and at three conditions with steam to carbon molar ratios (S/C) of 0.5, 0.2 and 0.07 nominally. The oxygen to carbon molar ratio (O/C) was maintained constant throughout at a nominal 0.84. The experiments were run sequentially for one hour at each condition in the order described above with rapid step changes in feed rates being made at changeovers.

Fuel and an air/water mixture were pumped into separate vaporisers at flowrates chosen to provide the required O/C and S/C ratios and GHSV. The vaporised fuel was injected into the mixture of preheated air and steam. Rapid vaporisation of the liquid feeds and thorough mixing was achieved by providing large surface areas for heat transfer and the use of a number of mixing tubes. The reactant gaseous mixture was supplied directly into to a quartz reactor. This consisted of a 300 mm long feed pipe, which opened out to form a 28 mm diameter reaction zone, with a sinter at its base. The catalyst was wrapped with a suitable sealing material around its circumference and loaded into the reactor so it touched the sinter. The reactant preheat temperature was maintained at 300° C. by heating the reactor feed pipe with a tube furnace, controlled by a thermocouple touching the sinter. The reaction zone of the reactor was enclosed within a second tube furnace. Its temperature was set to the expected catalyst exit temperature on the basis of thermochemical data. A plug of quartz wool was inserted into the reactor above the catalyst to minimise radiation losses from the catalyst.

The product gases from the catalyst were sampled 10 mm above the catalyst surface and their composition was determined by offline gas chromatography (GC). The water concentration in the sampled product gases was calculated from mass balances performed using the GC data and then used for normalisation of those results.

At the end of each three hour experiment, the air and liquid feeds were stopped, a nitrogen purge through the rig was started and the preheat and reactor furnaces powered down. The catalyst was allowed to cool before it was unloaded.

Carbon accumulated on the catalyst after each three hour long experiment was determined by temperature programmed oxidation (TPO). The catalyst was heated from room temperature to 1000° C. at 10° C./min in a stream of air and the concentration of carbon dioxide evolved throughout this period measured using a mass spectrometer.

The results are shown in Table 4 below.

One experiment was performed with Keropur which is a dispursary fuel additive. The results in table 4 show that the fuel compositions can generate hydrogen in a reformer and so are useful as fuels for fuel cell units. The results in table 4 show that on the basis of a number of parameters, namely higher hydrogen production and carbon conversion and lower ethylene production and carbon deposition on the catalyst, fuels W01/463 containing the additive, W01/464 and W01/465 showed significantly improved performance for an ATR application over W01/463 without the additive.

TABLE 4

| Sample | Run No/ Book No | O/C molar | S/C molar | H.C Conv (%) (<= C4) | Product Gas Composition (mole %) | | | | | | | Tin (C) | T react (C) | Total C (mg) |
| --- | --- | --- | --- | --- | --- | --- | --- | --- | --- | --- | --- | --- | --- | --- |
| | | | | | C2H4 | H2 | CO2 | CO | N2 + Ar | CH4 | Water | | | |
| W01/463 | 228/ 440 | 0.82 | 0.47 | 95.1 | 0.14 | 25.5 | 2.74 | 21.5 | 41.6 | 0.89 | 7.6 | 300 | 839 | 422 |
| | | 0.83 | 0.19 | 95.3 | 0.14 | 26.3 | 1.97 | 24.2 | 45.1 | 1.11 | 1.1 | 300 | 870 | |
| | | 0.82 | 0.07 | 90.9 | 0.56 | 22.7 | 1.67 | 23.5 | 48.7 | 1.76 | 0.9 | 300 | 880 | |
| W01/463 including 600 mg/kg Keropur | 234/ 440 | 0.84 | 0.48 | 98.3 | 0.05 | 28.0 | 2.81 | 21.4 | 40.4 | 0.74 | 6.6 | 300 | 839 | 443 |
| | | 0.84 | 0.19 | 98.3 | 0.05 | 28.9 | 1.76 | 24.5 | 43.8 | 0.99 | 0.5 | 300 | 870 | |
| | | 0.84 | 0.07 | 93.4 | 0.38 | 24.9 | 1.32 | 24.1 | 47.4 | 1.60 | 0.2 | 300 | 880 | |
| W01/464 | 233/ 440 | 0.84 | 0.48 | 97.7 | 0.08 | 26.9 | 2.56 | 21.5 | 40.7 | 0.84 | 7.3 | 300 | 839 | Not available |
| | | 0.84 | 0.19 | 97.7 | 0.06 | 28.2 | 1.73 | 24.2 | 43.8 | 1.04 | 0.8 | 300 | 870 | |
| | | 0.84 | 0.07 | 94.6 | 0.35 | 25.5 | 1.18 | 24.4 | 46.9 | 1.57 | N/D | 300 | 880 | |
| W01/465 | 230/ 440 | 0.86 | 0.48 | 97.4 | 0.04 | 26.4 | 3.00 | 21.0 | 41.3 | 0.88 | 7.2 | 300 | 839 | 319 |
| | | 0.85 | 0.19 | 97.3 | 0.05 | 27.2 | 1.89 | 24.0 | 44.5 | 1.13 | 1.1 | 300 | 870 | |
| | | 0.85 | 0.07 | 96.4 | 0.10 | 25.6 | 1.04 | 25.2 | 46.6 | 1.45 | N/D | 300 | 880 | |

The invention claimed is:

1. A method of fuelling a fuel cell apparatus, said method comprising:
  (a) providing a fuel composition comprising at least one saturated aliphatic hydrocarbon having 4 to 12 carbon atoms, and having:
    an olefin content of less than less than 20% by volume,
    an aromatics content of less than 35% by volume,
    a final boiling point (fbp) of less than 215° C.,
    a sulphur content of less than 20 ppm,
    a Motor Octane Number of at least 80, and
    a Research Octane Number of at least 90;
  (b) providing a fuel cell apparatus comprising a conversion unit and a fuel cell unit;

(c) introducing the fuel composition into the conversion unit;

(d) operating the conversion unit to convert at least some of the fuel composition into a product stream comprising hydrogen; and (e) introducing the hydrogen produced in the conversion unit into the fuel cell unit.

2. A method as claimed in claim 1 further comprising passing said fuel composition through a sulphur trap.

3. A method as claimed in claim 1 in which the amount of saturated aliphatic hydrocarbon in said fuel composition is greater than 50% by volume.

4. A method as claimed in claim 1 in which the amount of saturated aliphatic hydrocarbon in said fuel composition is greater than greater than 70% by volume.

5. A method as claimed in claim 1 in which the amount of saturated aliphatic hydrocarbon in said fuel composition is greater than greater than 80% by volume.

6. A method as claimed in claim 1 in which the amount of saturated aliphatic hydrocarbon in said fuel composition is greater than greater than 90% by volume.

7. A method as claimed in claim 1 in which the fuel composition has an olefin content of less than 10% by volume.

8. A method as claimed in claim 1 in which the fuel composition has an olefin content of less than 5% by volume.

9. A method as claimed in claim 1 in which the fuel composition has an olefin content of less than 3% by volume.

10. A method as claimed in claim 1 in which the fuel composition has an aromatics content of less than 25% by volume.

11. A method as claimed in claim 1 in which the fuel composition has an aromatics content of less than 10% by volume.

12. A method as claimed in claim 1 in which the fuel composition contains at least one oxygenate, preferably in an amount of less than 5% by volume.

13. A method as claimed in claim 1 in which the fuel composition has a sulphur content by weight of less than 10 ppm by weight.

14. A method as claimed in claim 1 in which the fuel composition has a sulphur content by weight of less than 5 ppm by weight.

15. A method as claimed in claim 1 in which the fuel composition has a sulphur content by weight of less than 1 ppm by weight.

16. A method as claimed in claim 1 in which the fuel composition has a sulphur content by weight of less than 0.5 ppm by weight.

17. A method as claimed in claim 1 in which the fuel composition has a sulphur content of less than 0.1 ppm by weight.

18. A method as claimed in claim 1 in which the fuel composition has a final boiling point (fbp) of less than 200° C.

19. A method as claimed in claim 1 in which the fuel composition has a final boiling point (fbp) of less than 185° C.

20. A method as claimed in claim 1 in which the fuel composition has a final boiling point (fbp) of less than 180° C.

21. A method as claimed in claim 1 in which the fuel composition has a final boiling point in the range 155 to 175° C.

22. A method as claimed in claim 1 in which the fuel composition comprises at least 2% by volume of a highly branched alkane having the formula R—$CH_2$—CH($CH_3$)—C($CH_3$)$_2$—$CH_3$ where R is hydrogen or a methyl group or an alkane "A" having 8-12 carbon atoms, and having at least 4 methyl and/or ethyl branches.

23. A method as claimed in claim 22 in which the fuel composition comprises greater than 70% by volume of a highly branched alkane having the formula R—$CH_2$—CH($CH_3$)—C($CH_3$)$_2$—$CH_3$ where R is hydrogen or a methyl group or an alkane "A" having 8-12 carbon atoms, and having at least 4 methyl and/or ethyl branches.

24. A method as claimed in claim 22 in which the fuel composition comprises greater than 80% by volume of a highly branched alkane having the formula R—$CH_2$—CH($CH_3$)—C($CH_3$)$_2$—$CH_3$ where R is hydrogen or a methyl group or an alkane "A" having 8-12 carbon atoms, and having at least 4 methyl and/or ethyl branches.

25. A method as claimed in claim 22 in which the fuel composition comprises greater than 90% by volume of a highly branched alkane having the formula R—$CH_2$—CH($CH_3$)—C($CH_3$)$_2$—$CH_3$ where R is hydrogen or a methyl group or an alkane "A" having 8-12 carbon atoms, and having at least 4 methyl and/or ethyl branches.

26. A method as claimed in claim 22 in which the fuel composition comprises greater than 95% by volume of a highly branched alkane having the formula R—$CH_2$—CH($CH_3$)—C($CH_3$)$_2$—$CH_3$ where R is hydrogen or a methyl group or an alkane "A" having 8-12 carbon atoms, and having at least 4 methyl and/or ethyl branches.

27. A method as claimed in claim 1 in which the fuel composition further comprises additives for use in an internal combustion engine.

* * * * *